Patented July 14, 1953

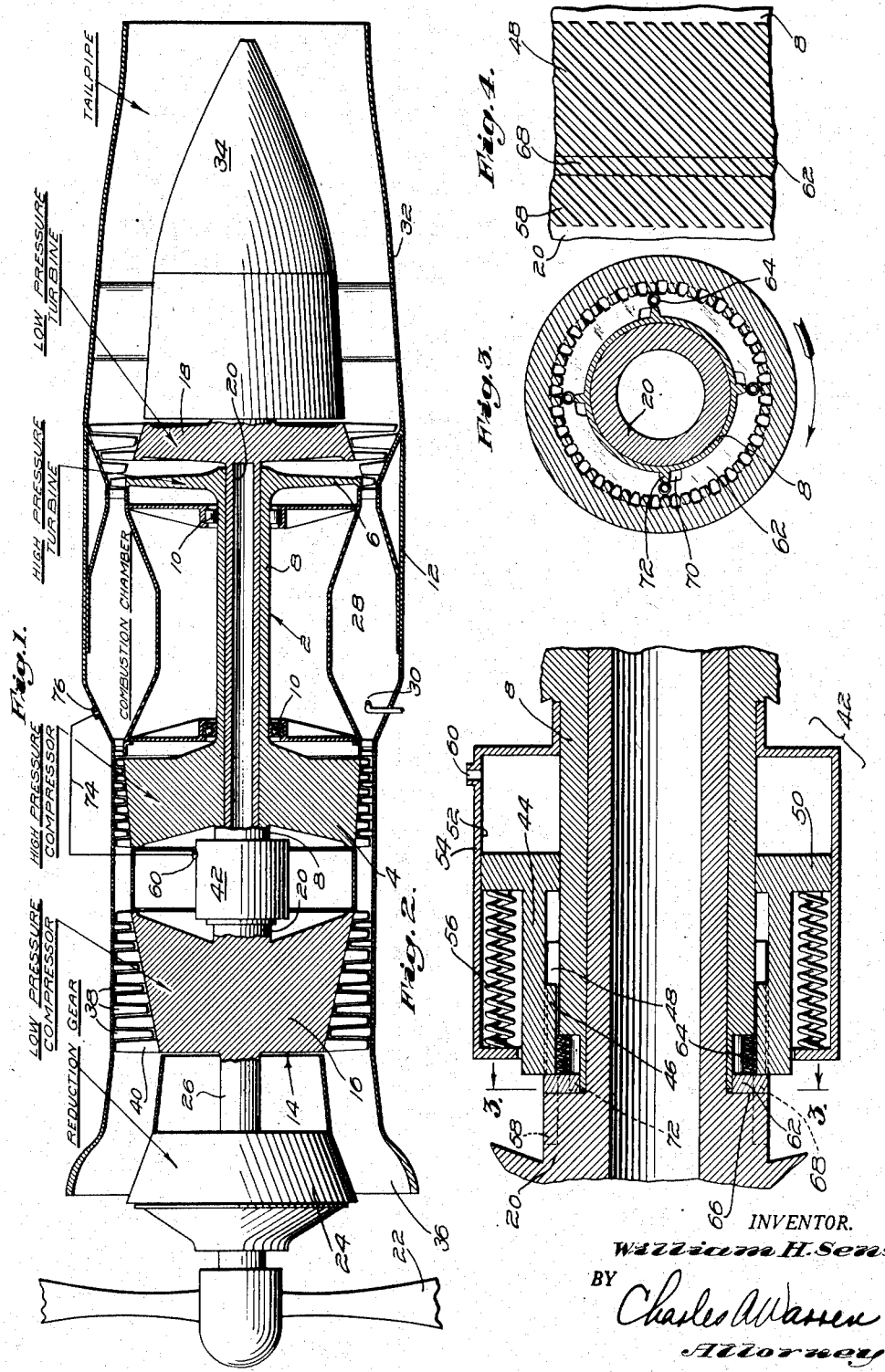

2,645,412

UNITED STATES PATENT OFFICE 2,645,412

LOCKING DEVICE FOR SPLIT-COMPRESSOR TYPE TURBOPOWER PLANTS

William H. Sens, Hartford, Conn., assignor to United Aircraft Corporation, East Hartford, Conn., a corporation of Delaware Application September 28, 1949, Serial No. 118,384

3 Claims. (Cl. 230—116)

This invention relates to gas turbine power plants of the split-compressor type.

In this type of power plant the multistage compressor is split so that the low pressure stages may be driven independently of the high pressure stages. One arrangement includes concentric inner and outer spools, the outer spools having the high pressure compressor stages and driving turbine stage or stages with an interconnecting drive shaft. The inner spool then includes the low pressure compressor stages, its driving turbine stages, and an interconnecting shaft preferably within and concentric to the shaft for the outer spool.

The principal feature of the invention is a locking device which will allow the high pressure or outer spool to revolve faster than the low pressure spool, but which will lock the shafts together whenever the speed of the inner spool reaches that of the outer spool. An arrangement of this type allows for a larger pressure ratio across the high pressure compressor with suitable matching of the low and high pressure stages. Another feature is that the power plant has better power recovery as the speed of both spools can be maintained at high values in spite of reduced turbine inlet temperatures.

Other objects and advantages will be apparent from the following detail description.

Fig. 1 is a sectional view of the power plant.

Fig. 2 is a sectional view on a larger scale of the locking device.

Fig. 3 is a sectional view substantially on the line 3—3 of Fig. 2.

Fig. 4 is a fragmentary developed view of the helical splines.

In the arrangement shown the power plant consists of an outer spool 2 which includes the high pressure compressor stages 4, the first or high pressure turbine stage 6 and the interconnecting shaft 8 journalled in bearings 10 supported between casing 12 of the power plant. The inner spool 14 is made up of the low pressure compressor stages 16, the low pressure turbine stages 18 and the interconnecting shaft 20 journalled within the shaft 8 of the outer spool.

In the arrangement shown the low pressure turbine stages not only drive the low pressure compressor stages but also drive a propeller system 22 connected through a reduction gear 24 to a forward extending shaft 26 on the low pressure compressor.

Between the last stage of the high pressure compressor stages and the turbine is the combustion chamber construction 28 (in which fuel delivered through nozzles 30 is burned in the air compresed by the compressor). The combustion chamber construction is not a part of the present invention and it will not be described in detail.

Downstream of the turbine is the exhaust duct 32 which surrounds the tail cone 34 and defines the annual path through which the gas exhausting from the turbine is discharged as a propulsive jet. In the arrangement shown, air is admitted to the low pressure compressor through an annular inlet 36 of any suitable construction. It will be understood that the compressor stages are made up of alternating stationary vanes 38 and rotating blades 40 of well-known construction.

The invention resides in an arrangement for locking the spools together for rotation at the same speeds at any time that the low pressure compressor overtakes the high pressure compressor or alternatively at any time that the high pressure compressor speed is reduced to that of the low pressure compressor. The particular arrangement shown for accomplishing this is a coupling 42 located between the low and high pressure compressors and connected to the shafts 8 and 20. This coupling includes an axially slidable connecting sleeve 44 having splines 46 on its inner surface cooperating with spline 48 on the forward end of the shaft 8. The right-hand end of the sleeve 44 has an integral plunger 50 slidable in an annular cylinder 52 defined between a house 54 surrounding the end of the shaft 8 and the outer surface of the shaft. A coil spring 56 normally urges the sleeve and associated piston toward the right to the position shown, in which position the inner and outer spools are free to rotate independently of each other.

The shaft 20 has associated therewith splines 58 on its outer surface which are in a position to mesh with the splines 46 on the sleeve 44 when the latter is moved forwardly or to the left as by pressure inducted into the cylinder 52 through an inlet 60. The sleeve 44 is normally prevented from moving into engagement with the splines 58 so long as the outer spool is rotating faster than the inner spool by a locking ring 62 mounted on the extreme forward end of the shaft 8 and pressed as by springs 64 against a shoulder 66 on the shaft 20. The outer surface of this locking ring has splines 68 in a position to be aligned with the splines 46. The inner surface of the locking ring has grooves 70 engaging with splines 72 on the end of the shaft 8. The grooves are wider than the splines and allow a small amount of angular movement between the locking ring and the shaft 8. So long as the outer spool which includes the shaft 8 is rotated faster than the inner spool the locking ring 62 is driven by the splines 72 and is held by the frictional drag between the ring and the shoulder 66 so that the splines 68 are out of alignment with the splines 46 and prevent the sleeve 44 from moving to the left beyond the position shown. Whenever the inner spool overtakes the outer spool or conversely when the outer spool slows down to the speed of the inner spool the frictional drag between the shoulder 66 and the locking ring 62 shifts the ring 62 angularly with respect to the splines 46 so that the splines 68 will align with the splines 46 and allow the sleeve 44 to move to the left into driving engagement with the splines 58. It will be noted that the splines 46 are long enough to mesh simultaneously with the splines 48 and 58 so that the spools will be driven in unison.

The fluid pressure for actuating the sleeve 44 may be obtained from the discharge end of the compressor. For example, as shown in Fig. 1, the inlet 60 may be connected by lead 74 to a port 76 in the combustion chamber 28. With this arrangement whenever the power plant is stopped the pressure in the combustion chamber drops so that the spring 56 may act upon the sleeve 44 and disengage it from the splines 58.

As stated above, the two spools are connected together only if the speed of the outer spool decreases to a speed equal to that of the inner spool. If after the two spools are mechanically connected together by the coupling, the power delivered is such that the outer spool begins to drive the inner spool, and if uncoupled would reach a speed higher than that of the inner spool, the coupling 42 is automatically disengaged. To accomplish this the splines 46 and 48 and also the splines 58 and 68 are helically arranged, as shown for example in the fragmentary developed sectional view of Fig. 4. Thus so long as the inner spool is driving the outer spool the sleeve 44 stays in its left-hand connecting position. If, on the other hand, the outer spool begins to accelerate and attempts to drive the inner spool, the helical arrangement of the splines is such that the sleeve 44 is caused to move to the right to be withdrawn to the position shown in Fig. 2. The locking ring 62 then becomes operative and prevents re-engagement until the inner and outer spools again reach the same speeds.

It is to be understood that the invention is not limited to the specific embodiment herein illustrated and described, but may be used in other ways without departure from its spirit as defined by the following claims.

I claim:

1. In a gas turbine power plant, a multistage compressor with the stages arranged in separate rotating groups of high and low pressure stages, a multistage turbine with the stages arranged in separate groups, a driving connection from one group of turbine stages to the high pressure compressor stages forming an outer rotating spool, another driving connection between the other groups of compressor and turbine stages forming an inner spool with both spools on the same axis, an axially slidable member mounted on one of said driving connections, means for connecting said axially slidable member with the second driving connection so that said spools will rotate as a unit when the rotational speed of the second driving connection tends to exceed the speed of the first driving connection, and means for disconnecting said axially slidable member from said second driving connection when the rotational speed of the first driving connection tends to exceed the speed of the second driving connection.

2. In a gas turbine power plant, a multistage compressor with the stages arranged in separate rotating groups of high and low pressure stages, a multistage turbine with the stages arranged in separate groups, a driving connection from one group of turbine stages to the high pressure compressor stages forming an outer rotating spool, another driving connection between the other groups of compressor and turbine stages forming an inner spool with both spools on the same axis, external splines on both of said driving connections, an internally splined member mounted on the outer spool driving connection, said member being axially slidable thereon, means for engaging said member with the splines on the inner spool driving connection when the inner spool speed tends to exceed the speed of the high pressure spool, and means for preventing engagement of the member with the splines on the inner spool when the high pressure spool tends to exceed the speed of the low pressure spool.

3. In a gas turbine power plant, a multistage compressor with the stages arranged in separate rotating groups of high and low pressure stages, a multistage turbine with the stages arranged in separate groups, a driving connection from one group of turbine stages to the high pressure compressor stages forming an outer rotating spool and another driving connection between other groups of compressor and turbine stages forming an inner spool with both spools on the same axis, helical splines on both of said spools, an internally splined and axially slidable sleeve mounted on the splines on the outer spool, pressure responsive means for causing engagement of said sleeve with the splines on the inner spool, means for permitting engagement only when the inner spool speed tends to exceed the speed of the outer spool, and spring loaded means opposing said pressure responsive means and tending to maintain said sleeve in an unengaged position on the outer spool.

WILLIAM H. SENS.

References Cited in the file of this patent

UNITED STATES PATENTS

| Number | Name | Date |
|---|---|---|
| Re. 23,198 | Anxionnaz | Feb. 21, 1950 |
| 2,197,179 | Hersey | Apr. 16, 1940 |
| 2,243,467 | Jendrassik | May 27, 1941 |
| 2,397,941 | Birkigt | Apr. 9, 1946 |
| 2,399,098 | Carnagua et al. | Apr. 23, 1946 |
| 2,433,428 | Carnagua et al. | Dec. 30, 1947 |
| 2,444,456 | Lysholm | July 6, 1948 |

FOREIGN PATENTS

| Number | Country | Date |
|---|---|---|
| 411,472 | France | Apr. 12, 1910 |
| 588,096 | Great Britain | May 14, 1947 |
| 600,608 | Great Britain | Apr. 14, 1948 |